United States Patent
Sato et al.

(10) Patent No.: US 6,991,150 B2
(45) Date of Patent: Jan. 31, 2006

(54) METHOD OF BUILD UP WELDING TO THIN-WALLED PORTION

(75) Inventors: Akihiro Sato, Yokohama (JP);
Kiyofumi Ishikawa, Hiratsuka (JP);
Hiroyuki Miyazawa, Yokohama (JP);
Hiroto Yamaoka, Yokohama (JP);
Yasuhiro Aoki, Nishi-tokyo (JP)

(73) Assignees: Ishikawajima-Harima Heavy Industries Co., Ltd., Tokyo (JP);
Ishikawajima Inspection & Instrumentation Co., Ltd., Tokyo (JP)

( * ) Notice: Subject to any disclaimer, the term of this patent is extended or adjusted under 35 U.S.C. 154(b) by 119 days.

(21) Appl. No.: 10/651,203

(22) Filed: Aug. 29, 2003

(65) Prior Publication Data

US 2005/0173496 A1     Aug. 11, 2005

(30) Foreign Application Priority Data

Mar. 20, 2003  (JP) ............................. 2003-077247

(51) Int. Cl.
*B23K 31/02* (2006.01)
*B23P 6/04* (2006.01)

(52) U.S. Cl. ............... 228/119; 228/212; 228/256; 29/889.1

(58) Field of Classification Search .............. 228/227, 228/229, 119, 256, 212; 29/889.1–889.722; 219/158

See application file for complete search history.

(56) References Cited

U.S. PATENT DOCUMENTS

| | | | |
|---|---|---|---|
| 3,634,649 A * | 1/1972 | Rager et al. ............. 219/137 R |
| 3,821,840 A * | 7/1974 | Kershaw .................. 29/402.18 |
| 4,298,154 A * | 11/1981 | DeFusco ..................... 228/49.1 |
| 4,841,117 A | 6/1989 | Koromzay |
| 4,927,992 A * | 5/1990 | Whitlow et al. ........ 219/121.65 |
| 4,982,066 A * | 1/1991 | Waring .................. 219/137 PS |
| 5,014,901 A * | 5/1991 | Moran ......................... 228/119 |
| 5,319,179 A | 6/1994 | Joecks |
| 5,553,370 A * | 9/1996 | Pepe .......................... 29/889.1 |
| 5,811,756 A * | 9/1998 | Horita et al. ........ 219/137 WM |
| 6,034,344 A | 3/2000 | Ittleson |

(Continued)

FOREIGN PATENT DOCUMENTS

EP     1 371 439 A1     12/2003

(Continued)

OTHER PUBLICATIONS

Sorokin, L.I. et al, "Welding up of marking holes in the repair of turbine blades of KhS26VSNK alloy", Welding International, Welding Institute, Abington, GB, vol. 17, No. 1, 2003, pps. 75-77, XP001159242; ISSN:0950-7116.
European Search Report, completed Jul. 6, 2004.

*Primary Examiner*—Kiley S. Stoner
(74) *Attorney, Agent, or Firm*—Griffin & Szipl, P.C.

(57) ABSTRACT

A recess formed in close contact with a thin-walled portion $3a$ of a workpiece to store molten metal at a surfaced portion, a jig 4 manufactured from a material with a higher heat-resisting temperature than that of the molten metal and a satisfactorily large heat capacity, a step (A) wherein the jig is installed on the workpiece, a preheating step (B) in which the workpiece and the jig are preheated to a predetermined temperature under the condition that jig 4 is installed, a build up welding step (C) for build up welding the thin-walled portion of the workpiece and forming weld beads at surfaced portion, and a jig-removing step (D) for removing the jig after weld beads solidify completely.

8 Claims, 5 Drawing Sheets

U.S. PATENT DOCUMENTS

| | | | |
|---|---|---|---|
| 6,054,672 A * | 4/2000 | Foster et al. | 219/121.66 |
| 6,333,484 B1 * | 12/2001 | Foster et al. | 219/121.64 |
| 6,376,801 B1 * | 4/2002 | Farrell et al. | 219/124.34 |
| 6,727,459 B1 * | 4/2004 | Bialach | 219/121.64 |
| 2001/0003334 A1 * | 6/2001 | Kano et al. | 219/444.1 |
| 2003/0071108 A1 * | 4/2003 | Reser et al. | 228/119 |

FOREIGN PATENT DOCUMENTS

| | | | |
|---|---|---|---|
| EP | 001459829 A1 * | 9/2004 |
| JP | 362267079 A * | 11/1987 |
| JP | 362282796 A * | 12/1987 |
| JP | 07171682 | 7/1995 |
| JP | 10-180442 | 7/1998 |

\* cited by examiner

METHOD OF BUILD UP WELDING TO THIN-WALLED PORTION

This application claims priority from Japanese Patent Application No. 2003-77247, filed Mar. 20, 2003, the entire disclosure of which is incorporated herein by reference.

BACKGROUND OF THE INVENTION

1. Technical Field of the Invention

The present invention relates to a method of build up welding to a thin-walled portion, and more particularly, a method repairing the tip portion of a moving blade of a gas turbine.

2. Description of the Related Art

FIG. 1 is a general external view showing a moving blade of a turbine. The moving blade is composed of blade portion 1, dovetail portion 2, and tip portion 3. Blade portion 1 has a blade-shaped section and generates rotational power from combustion gas. Dovetail portion 2 is located at an end of the blade portion 1, is fixed at a turbine disk not illustrated, and transmits rotational power to the turbine disk. The tip portion 3 has a thin-walled portion $3a$ that extends in the rotating direction. The tip of the tip portion 3 reduces leakage of gas as it closely faces the inner surface of the casing.

The moving blade of a gas turbine, with which high temperature and high pressure combustion gas collides, operates under very severe conditions. Consequently, thick-walled portion $3a$ at the tip of the moving blade may be subject to erosion of the wall or cracking due to abrasion and high temperature oxidation during operation. In such a case, the thin-walled portion is repaired by build up welding.

Conventional means of build up welding are already disclosed in patent references 1 and 2.

[Patent Reference 1]

Unexamined Japanese patent publication No. 171682, 1995

[Patent Reference 2]

Unexamined Japanese patent publication No. 180442, 1998

"Method of build up welding surface corner and build up welding jig" of Patent Reference 1 is shown in FIG. 2; before beginning the build up welding treatment, a build up welding jig 51 for cooling is placed in close contact with the corner surface side $53a$ of a welding workpiece 53, then build up welding is performed on the corner surface side $53b$, and after weld beads 54 solidify, the build up welding jig 51 is detached from the welding workpiece 53.

"Method of repairing gas turbine blade" of Patent Reference 2 is shown in FIG. 3; when the tip of a gas turbine blade is repaired by build up welding, gas or fluid is passed through a ventilation hole inside the moving blade, during the repair operation. In FIG. 3, 61 represents the moving blade of a gas turbine, 63 build up welding portion, 64 the nozzle of a welding torch, 65 a welding electrode, 66 an arc, 68 an injection port of the gas or fluid, and 69 the gas or fluid.

Conventionally, a gas turbine moving blade is made mainly of a Ni base alloy. Such an Ni base alloy has a high tensile strength and extensibility, so one of its advantages is that defects are seldom produced as a result of the aforementioned build up welding.

Recently, on the other hand, studies and practice have led to a metal with a specific gravity smaller than that of the Ni base alloy (for instance, TiAl alloy) being used for gas turbine moving blades to improve the performance of the gas turbine. The specific gravity of the TiAl alloy is about one half that of the Ni base alloy, and is provided with higher toughness, so when TiAl alloy is used for gas turbine moving blades, the centrifugal force applied to the turbine disk by the moving blades installed can be sharply reduced and the gas turbine can rotate at a higher speed, which are advantages.

Table 1 compares the characteristics of the Ni base alloy and the TiAl alloy.

TABLE 1

| Alloy | Code Name | Composition (Wt %) | Specific gravity (g/cm3) | Tensile strength (MPa) | Specific toughness (10E3m) | Extensibility (%) |
|---|---|---|---|---|---|---|
| Ni base alloy | IN100 | Ni-9.5Cr-15Co-3Mo-4.8Ti-5.5Al-0.015B-0.95V-0.06Zr | 7.75 | 1014 | 13 | 5 |
| TiAl alloy | K5C | Ti-31.2Al-7.0Nb-2.6Cr-1.4W-0.27B-0.06C | 4 | 683 | 17 | 0.9 |

However, if build up welding is applied for a thin-walled portion in the same way as conventional methods, with moving blades made of TiAl alloy for the gas turbine, as shown in FIGS. 4A and 4B, there are problems such as molten metal dripping from a corner portion of thin-walled portion $3a$ and a dull corner portion.

To solve these problems, if a cooled jig is installed at the corner surface side as shown in Patent Reference 1, because of the small amount of extensibility and low tensile strength of TiAl alloy, there is a problem in that a weld crack is created by thermal stress at build up welding metal 5.

In FIGS. 4A and 4B, a and b show dull portion and weld crack portion, respectively.

SUMMARY OF THE INVENTION

The present invention aims to solve these problems. More explicitly, an object of the present invention is to provide a method of build up welding to a thin-walled portion, whereby the thin-walled portion is composed of a material with a small amount of extensibility and a low tensile strength, and with neither drops of molten metal nor a dull corner, can be surface welded with the preferred result.

The present invention provides a method of build up welding to the thin-walled portion, comprised of a jig-mounting step (A), whereby the jig made of a material with a satisfactorily large heat capacity and higher heat-resistant temperature than the metal to be melted is installed at a thin-walled portion of a workpiece to form a recess that makes close contact with the thin-walled portion of the workpiece and stores the molten metal at a surfaced portion, a preheating step (B), whereby the workpiece and the jig are preheated to a predetermined temperature under the condition with the jig installed, next, a build up welding step (C), whereby the thin-walled portion of the workpiece is build up welded, and weld beads are formed at the surfaced portion, and next, a jig-removing step (D), in which the jig is removed after the weld beads have solidified.

According to a preferred embodiment of the present invention, the jig manufactured with the material having a sufficiently large heat capacity is a ceramic jig.

Also, the jig made of a material with a satisfactorily large heat capacity has a sufficiently large heat capacity to reduce the cooling speed of the thin-walled portion after build up welding.

In addition, the jig manufactured with a material having a satisfactorily large heat capacity is composed of a plurality of closely fitting segments shaped so as to make close contact with the thin-walled portion of the workpiece, and an outer-frame segment that encloses the plurality of closely fitting segments and holds the segments together.

It is preferred that the material of the workpiece is a TiAl alloy.

Preferably, the thin-walled portion of the workpiece is the tip portion of a turbine blade.

According to the above-mentioned method of the present invention, because the heat-resistant temperature of the jig made of a material with a satisfactorily large heat capacity is higher than the heat-resistant temperature of the molten metal and the recess is formed close to the thin-walled portion of the workpiece to store the molten metal, the recess plays the role of a casting die for the molten metal, so drops of molten metal and dull corners can be prevented from being produced, and a preferred shape of the molten metal can be created.

In addition, the jig provides a high heat-holding effect because the jig has a satisfactorily large heat capacity and fits closely to the thin-walled portion of the workpiece.

Also, because the workpiece and the jig are preheated to a predetermined temperature under a condition in which the jig is installed and the jig is removed after weld beads have completely solidified, the cooling rate at the thin-walled portion after build up welding can be reduced and heat stresses produced can be decreased, so even if the material may otherwise be easily cracked after welding, the material can be surfaced without actually being cracked.

Other objects and advantages of the present invention are revealed according to the following description referring to the attached drawings.

DESCRIPTION OF THE PREFERRED EMBODIMENTS

Figure 1:
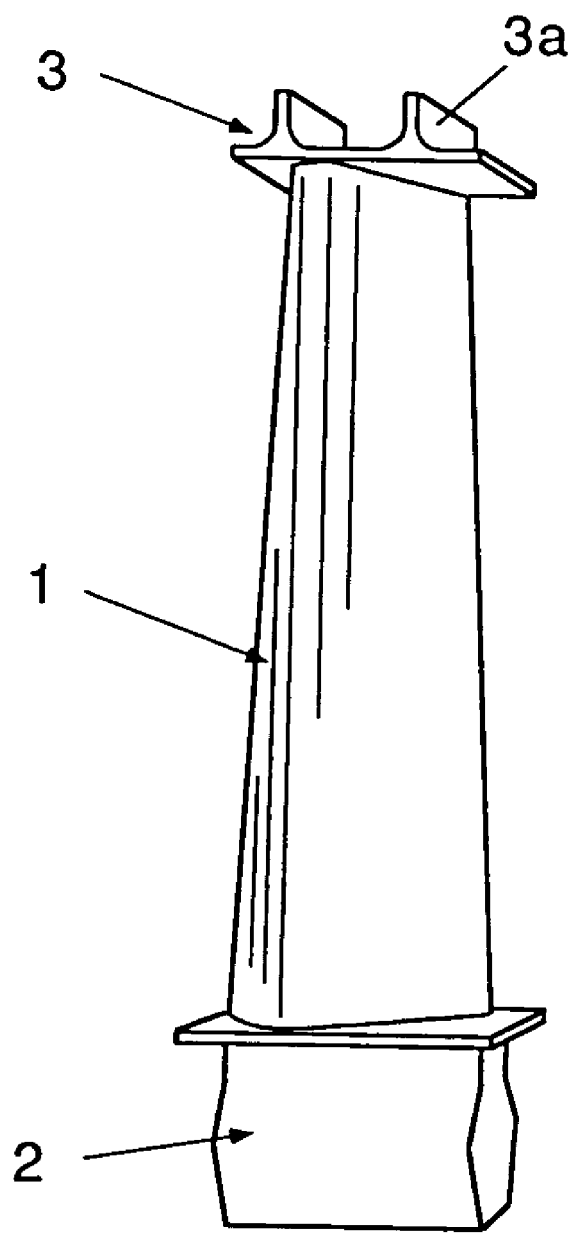
FIG. 1 is a sketch of a moving blade of a turbine.
Figure 2:
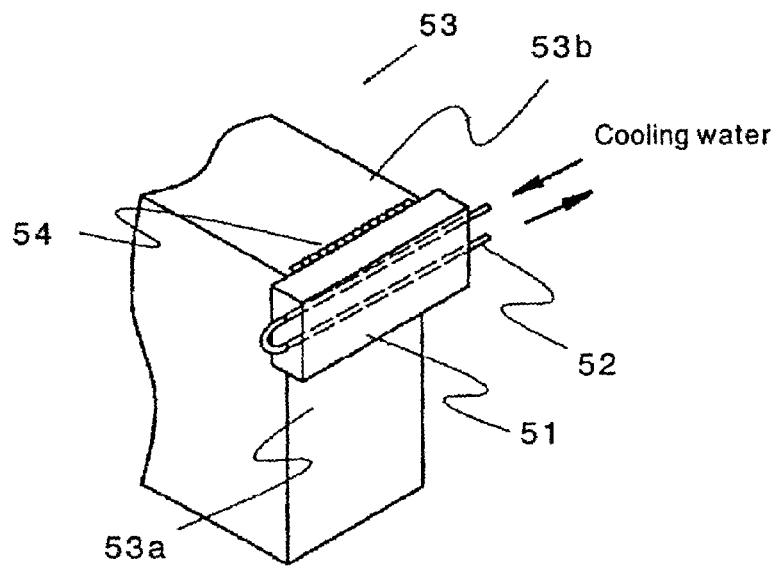
FIG. 2 shows a conventional build up welding means.
Figure 3:
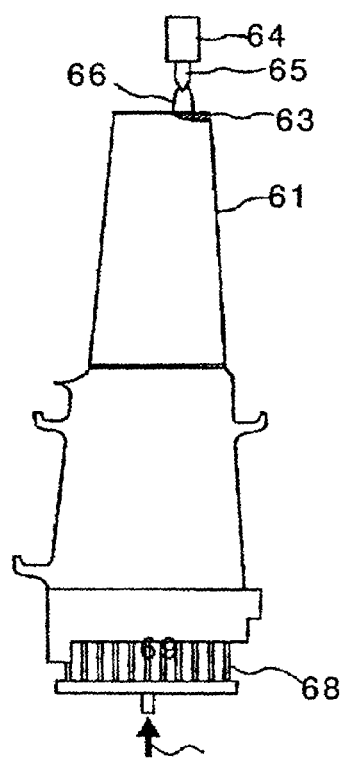
FIG. 3 is another conventional build up welding means.

Preferred embodiments of the present invention are described referring to the drawings. Common portions in each drawing are identified with the same numbers, without duplicating descriptions.

Figure 5:
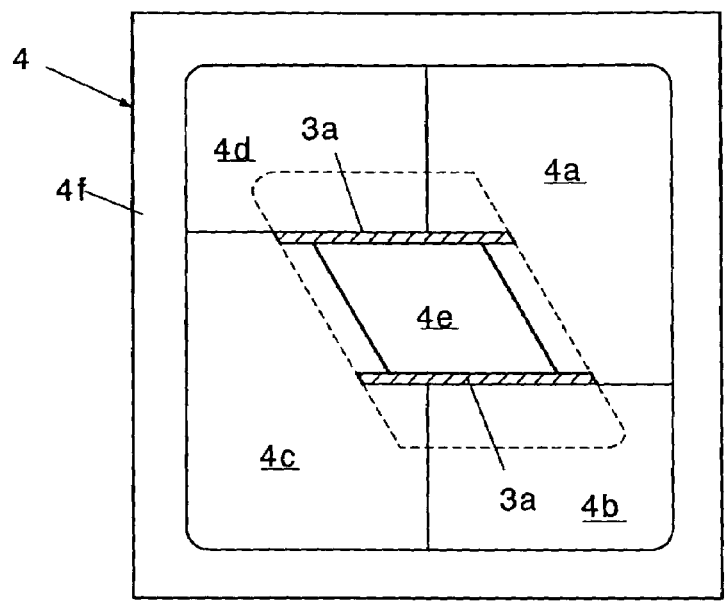
FIG. 5 is a structural view of a ceramic jig according to the present invention.

FIG. 5 is a structural view of a ceramic jig used according to the present invention. As shown in FIG. 5, ceramic jig 4 is composed of a plurality (5 in this example) of closely fitting segments 4a to 4e and an outer-frame segment 4f.

Each closely fitting segment 4a to 4e is shaped to closely fit thin-walled portions 3a (hatched portions) of a workpiece (in this example, the tip portion of a turbine blade). Also, the inner surface of the outer-frame segment 4f encloses plurality of the closely fitting segments 4a to 4e and holds the segments in an integrated manner.

The ceramic jig 4 is made of a ceramic with a higher heat-resistant temperature than the heat-resistant temperature of the molten metal. Each closely fitting segment is planar and thicker than the thin-walled portion, and forms a recess that stores molten metal at a surfaced portion. Moreover, the ceramic jig 4 is devised to have a satisfactorily large heat capacity in its entirety to reduce the temperature-cooling rate of the thin-walled portion after build up welding is completed.

Figure 6:
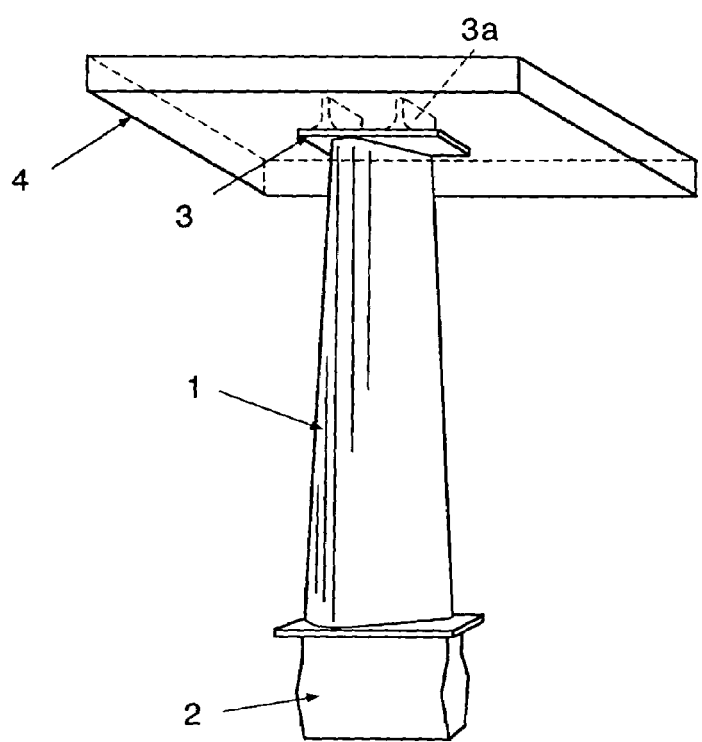
FIG. 6 is a sketch of the method of the present invention.

FIG. 6 is a typical view showing the method of the present invention.

The build up welding method according to the present invention is comprised of jig-mounting step (A), preheating step (B), build up welding step (C), and jig removing step (D).

As shown in FIG. 6, in jig-mounting step (A), ceramic jig 4 is closely fitted to thin-walled portion 3a of the workpiece, and is installed so that there is a recess that stores molten metal in a portion to be surfaced.

In preheating step (B), the workpiece and the ceramic jig are preheated to a predetermined temperature under the condition in which ceramic jig 4 has been installed. This predetermined temperature is an appropriate preheating temperature for the material of the workpiece. For example, for a TiAl alloy, the temperature should not be less than 800° C. or more than 1,000° C. In such a preheating process, the workpiece should be heated uniformly using a heating furnace etc.

Next, in build up welding step (C), a thin-walled portion of the workpiece is build up welded, and weld beads are formed at the surfaced portion. The preferred material used for build up welding is the same as the material of the workpiece. However, if weldable, a different material can also be used. The preferred build up welding method is arc welding, but another means of welding, such as TIG welding can also be employed.

In the next jig removing step (D), jig 4 is removed from the workpiece after weld beads have completely solidified. In this step, in the case of the ceramic jig 4 shown in FIG. 5, the outer-frame segment 4f is slid over the inner surface and is removed, then each closely fitting segment 4a to 4e is separated from the thin-walled portion of the workpiece, thereby the jig can be easily removed.

Figure 7A:
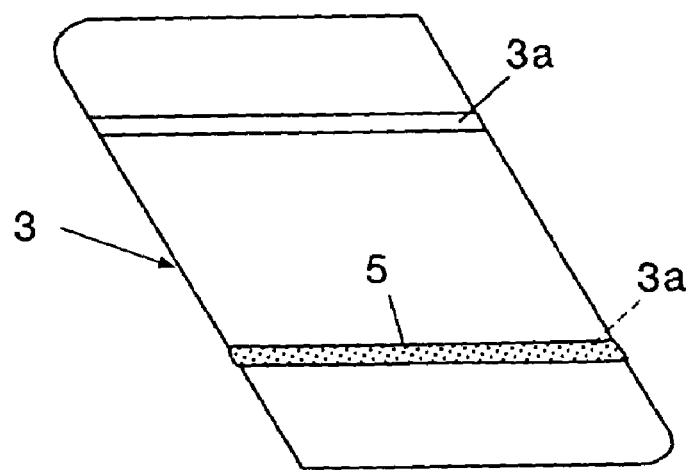
FIGS. 7A and 7B show the results of build up welding according to the present invention.
Figure 7B:
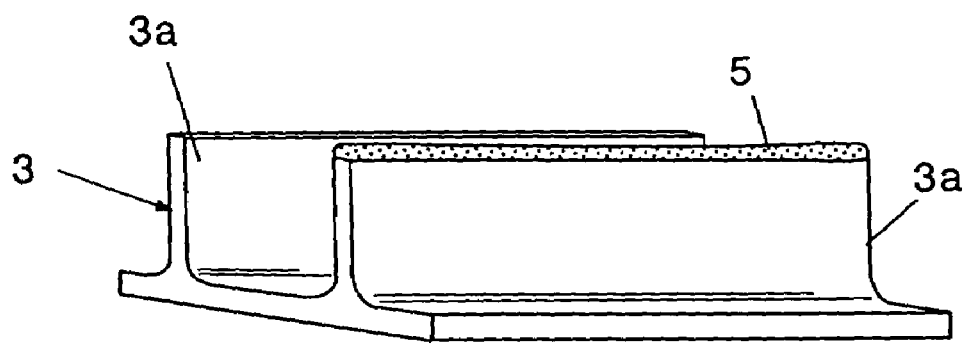

FIGS. 7A and 7B show results of build up welding according to the present invention. FIG. 7A is a view of an end surface of tip portion 3, while FIG. 7B stereoscopically shows the tip portion 3. This example relates to a turbine blade made of a TiAl alloy, wherein one of the thin-walled portions at the tip is surfaced by an arc-welding method using the same material as that of the workpiece. The actual preheating temperature is 900° C.

Figure 4A:
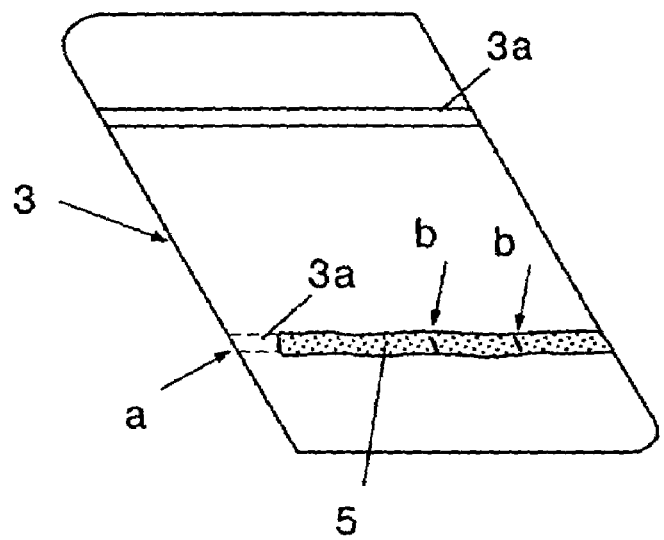
FIGS. 4A and 4B show the results of conventional build up welding.
Figure 4B:
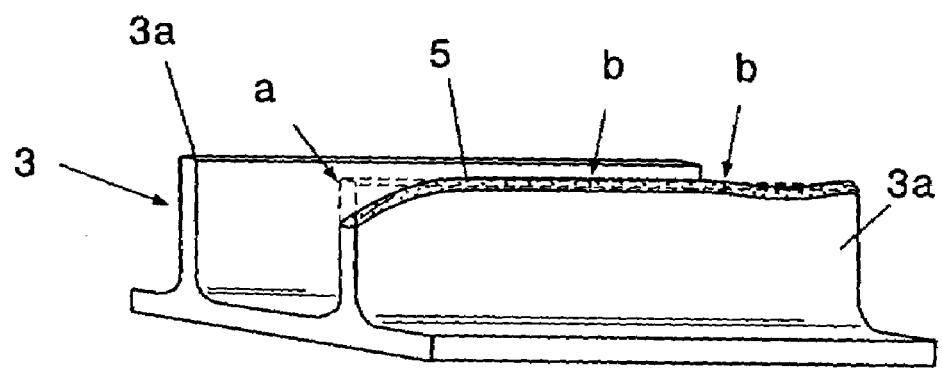

Obviously, by comparing FIGS. 7A and 7B with FIGS. 4A and 4B (conventional example), the build up welding method according to the present invention was confirmed to be capable of offering the preferred build up welding without drops of molten metal or dull corners.

As described above, according to the method of the present invention, because the heat-resisting temperature of ceramic jig 4 is higher than that of the molten metal and the jig makes close contact with the thin-walled portion 3a of the workpiece and a recess is formed to store the molten metal at a surfaced portion, the recess plays the role of a casting die for the molten metal, while suppressing drops of molten metal and dull corners, so the preferred shape of the workpiece can be manufactured.

As the ceramic jig 4 has a satisfactorily large heat capacity and closely fits the thin-walled portion 3a of the workpiece, a high temperature-holding effect is provided.

Furthermore, because the workpiece and the ceramic jig are preheated to a predetermined temperature and the jig is removed after weld beads have solidified completely under the condition in which the ceramic jig 4 is still installed, the cooling rate of the thin-walled portion 3a can be reduced after completion of build up welding and thermal stresses produced are reduced, so even if the material can otherwise crack easily after welding, it can be surfaced actually without cracks.

As described above, the method of build up welding to a thin-walled portion according to the present invention provides advantageous effects, for example, the thin-walled portion composed of a material whose extensibility is small and tensile strength is low can be surfaced advantageously without producing drops of molten metal or dull corners.

Although the present invention is described referring to a plurality of preferred embodiments, the scope of rights covered by the present invention should not be understood to be limited only to these embodiments. Rather, the scope of rights according to the present invention should include all modifications, corrections, and equivalent entities specified in the attached claims.

What is claimed is:

1. A method of build up welding to a thin-walled portion of a workpiece, comprising:

a jig-mounting step (A) for installing a jig to the thin-walled portion of the workpiece to form a recess, wherein the jig is manufactured from a material with a higher melting temperature than the melting temperature of the molten metal and a heat capacity sufficient to reduce a cooling rate of the thin-walled portion after build-up welding, wherein the jig comprises a plurality of closely fitting segments shaped to make close contact with the thin-walled portion of the workpiece, and an outer-frame segment that encloses and holds the plurality of the closely fitting segments in an integrated manner, and wherein the recess is to store the molten metal in a surfaced portion in the vicinity of the thin-walled portion of the workpiece;

a preheating step (B) for preheating the workpiece and the jig to a predetermined temperature under the condition with the jig installed to the thin-walled portion of the workpiece;

a build up welding step (C) for continually build up welding to the thin-walled portion of the workpiece and forming weld beads on a surfaced portion; and a jig-removing step (D) for removing the jig after the weld beads solidify completely.

2. The method of build up welding to a thin-walled portion of a workpiece, specified in claim 1, wherein the jig manufactured from the material with a heat capacity sufficient to reduce a cooling rate of the thin-walled portion after build-up welding comprises a ceramic jig.

3. The method of build up welding to a thin-walled portion of a workpiece, specified in claim 1, wherein the material of the workpiece is a TiAl alloy.

4. The method of build up welding to a thin-walled portion of a workpiece, specified in claim 1, wherein the thin-walled portion of the workpiece is the tip of a turbine blade.

5. A method of build up welding to a thin-walled portion of a workpiece, comprising the steps of:

(A) installing a jig to a thin-walled portion of a workpiece to form a recess, wherein the jig is manufactured from a material with a higher melting temperature than the melting temperature of a first molten metal and a heat capacity sufficient to reduce a cooling rate of the thin-walled portion after build-up welding, wherein the jig comprises a plurality of closely fitting segments shaped to make close contact with the thin-walled portion of the workpiece, and an outer-frame segment that encloses and holds the plurality of the closely fitting segments in an integrated manner, and wherein the recess is for storing the first molten metal in a surfaced portion in the vicinity of the thin-walled portion of the workpiece;

(B) preheating the workpiece and the jig to a predetermined temperature under the condition with the jig installed to the thin-walled portion of the workpiece;

(C) build up welding continuously to the thin-walled portion of the workpiece and forming weld beads on a surfaced portion; and (D) removing the jig after the weld beads solidify completely.

6. The method as specified in claim 1, wherein the jig comprises a ceramic jig.

7. The method as specified in claim 1, wherein the material of the workpiece is a TiAl alloy.

8. The method as specified in claim 1, wherein the thin-walled portion of the workpiece is the tip of a turbine blade.

* * * * *